(12) United States Patent
Williams

(10) Patent No.: US 6,570,394 B1
(45) Date of Patent: May 27, 2003

(54) TESTS FOR NON-LINEAR DISTORTION USING DIGITAL SIGNAL PROCESSING

(76) Inventor: Thomas H. Williams, 6423 Fairways Dr., Longmont, CO (US) 80503

( * ) Notice: Subject to any disclaimer, the term of this patent is extended or adjusted under 35 U.S.C. 154(b) by 1 day.

(21) Appl. No.: 09/761,398

(22) Filed: Jan. 16, 2001

Related U.S. Application Data

(63) Continuation-in-part of application No. 09/236,264, filed on Jan. 22, 1999, now abandoned.

(51) Int. Cl.$^7$ ............................................. G01R 23/20
(52) U.S. Cl. ..................................... 324/620
(58) Field of Search ................................. 324/620, 613, 324/614, 615, 616, 628; 370/286

(56) References Cited

U.S. PATENT DOCUMENTS 5,742,591 A * 4/1998 Himayat et al. ............ 370/286

OTHER PUBLICATIONS

Testing Cable Return Plant for Clipping–Use of a High– Speed Digital Oscilloscope—by Tom Williams, Specs Technology Publication of Cable Television Laboratories, Sep. 1996, vol. 8, No. 6.

\* cited by examiner

Primary Examiner—Safet Metjahic
Assistant Examiner—J Kerveros
(74) Attorney, Agent, or Firm—Lacasse & Associates, LLC; Randy W. Lacasse; Kevin E. Greene

(57) ABSTRACT

A system for determining a composite signal level at which a signal path begins to generate non-linear distortion. A reference test signal, which is preferably a short-duration burst of repeatable broadband energy, is passed through the signal path and received on a digital signal acquisition unit. An impaired received reference test signal is comprised of the transmitted reference test signal, linear distortion components, and non-linear distortion components. The impaired received reference test signal is digitally processed to reveal the non-linear distortion components. The impaired received reference test signal may be processed with a stored reference test signal to find a time-domain impulse response from which the uncorrelated distortion energy can be measured. Alternately, a reference test signal, such as an orthogonal frequency division multiplex (OFDM) reference signal with spectral holes, can be processed in the frequency domain to find the non-linear distortion energy that enters the spectral holes. Alternately, a transfer function of a signal path, showing an output voltage as a function of an input voltage, can be generated from a two-burst waveform comprised of a clipping high-level sinewave and non-clipping low-level sinewave. As the reference test signals are elevated in level, the magnitude of the non-linear distortion products can typically be observed to increase.

18 Claims, 10 Drawing Sheets

TESTS FOR NON-LINEAR DISTORTION USING DIGITAL SIGNAL PROCESSING

This application is a continuation in part (CIP) of U.S. patent application number 09/236,264 dated Jan. 22, 1999 now abandoned titled "Tests for Non-Linear Distortion Using Digital Signal Processing" of Thomas H. Williams, which is now abandoned.

BACKGROUND—FIELD OF THE INVENTION

This invention relates to systems for testing signal paths. More particularly, it relates to systems for measuring a non-linear distortion created by a reference test signal on signal paths. More particularly, it relates to systems for measuring a signal level at which an upstream cable television system begins to distort the signals that are being transported over it because a composite signal level is too high.

BACKGROUND—DESCRIPTION OF PRIOR ART

When setting signal levels for a transmission system it is important to operate with a high transmit power to have a best possible signal-to-noise ratio at a receiver. However, operating above the linear range of the transmission system creates high levels of non-linear distortion, which interfere with clear signal reception. The presence of linear distortion complicates the measurement of non-linear distortion. Whereas a percentage of non-linear distortion is dependent on input signal level, a percentage of linear distortion is not. Thus, there is a need to test non-linear distortion on a variety of level-sensitive signal paths including upstream cable television systems, high-powered high-definition television transmitters, microwave signal links, satellite transponders, and audio sound systems, so that the transmit signal levels can be set accurately.

A signal path may be represented as having a gain or a loss and both linear and non-linear distortion components. Amplifiers or filters with non-flat amplitude or non-linear phase response may create linear distortion components. Linear distortion components may also be created by multi-path distortion, which is also known as echoes or ghosts. Non-linear distortion components may be created by devices such as amplifiers with limited dynamic range, and laser diodes that extinguish if overdriven, or loudspeakers which have magnets that saturate if the loudspeaker is overdriven.

Non-linear distortion may be represented by a Taylor series that represents a transfer function of output voltage as a function of input voltage:

$$v_{out}(t) = A v_{in}(t) + B v_{in}(t)^2 + C v_{in}(t)^3 + \ldots \quad (1)$$

Where $v_{out}(t)$ is the output of the signal path, $v_{in}(t)$ is the input signal, A is the fundamental coefficient which is amplification, B is the second order distortion coefficient, and C is the third order distortion coefficient. The coefficients with a higher order than three may or may not be significant, depending on the nature of the signal path. If balanced push-pull amplifiers create the non-linear distortion, the even order distortion components, such as the second order distortion coefficient, B, tend to be greatly reduced.

The problem of finding the non-linear distortion characteristics of a signal path is greatly influenced by whether or not the signal path is wide bandwidth or narrow bandwidth. Wide bandwidth systems, such as cable TV systems or audio systems, pass more than an octave of bandwidth. If clipping occurs in a narrow bandwidth system, such as a high-powered broadcast transmitter, the distortion components will be close in frequency to the carrier. Typically the third-order distortion component will be the dominant component in narrow bandwidth systems.

Determining the dynamic range of a signal path is not a new problem. One solution that has been employed in the past on wide bandwidth systems is to transmit a continuous wave (CW) test signal (a sinewave) into a signal path, such as a cable television upstream system. The transmitted continuous wave is adjusted upward and downward in level at a house while observing the output of the signal path on a spectrum analyzer located in a headend. A headend is the origination point for downstream cable television signals and a termination point for upstream signals. The test signal level at which non-linear distortion is created may be noted as the level at which harmonics of the fundamental continuous wave are created, or cross some predetermined threshold. This test method requires that the bandwidth of the signal path be wide enough to pass harmonics of the fundamental test signal. For example, if the bandwidth of a cable system upstream signal path is 5 to 42 MHz, a CW signal of 8 MHz can be applied to the input of the signal path. If the signal path is being clipped, a second harmonic at 16 MHz, a third harmonic at 24 MHz, a fourth harmonic at 32 MHz, and a fifth harmonic at 40 MHz will all be created according to the Taylor series expansion of equation (1).

In a narrow bandwidth system, the above technique will not work because the bandwidth is too narrow to pass the higher-order harmonics.

The continuous wave can be used in a narrow bandwidth signal path to test the clipping point of a signal path by plotting the magnitude of the output signal level on an abscissa of a graph (Y-axis) vs. the magnitude input signal level on an ordinate of a graph (X-axis). The input and output levels may be measured on a spectrum analyzer. When the output level is low, there is little distortion, and an X-Y plot will be a straight line. As the input signal level is elevated there will be a point where the output signal level can no longer increase at the same rate as the input signal level because of clipping or non-linear distortion. An output signal level that is 1 dB lower than the straight line is a commonly used reference level, and is called the 1 dB compression point. Since magnitude measurements are used, the trace will be located in one quadrant of a Cartesian coordinate system.

Another similar prior art method that is used to test narrow bandwidth signal paths is to apply two CW test signals that are close in frequency to the signal path. As the two CW signals are elevated in level, distortion components at a pair of sum and difference frequencies will be created. If one continuous wave is at a frequency $f_a$ and the other is at a frequency $f_b$, the distortion components will be at frequencies of $2f_a - f_b$ and $2f_b - f_a$. These distortion products are typically generated by the third order distortion coefficient, C, in the Taylor series expansion.

When both ends of the wide bandwidth signal path are at the same physical location, the clip-point of a wide bandwidth signal path can be observed by exciting the signal path with a sine wave signal. A high-speed oscilloscope is put into an X-Y mode where the input signal is displayed on the X-axis and the output signal is displayed on the Y-axis. The signal path is excited by a CW signal. If there is no non-linearity, an X-Y trace will be a straight line. If there is non-linearity, the transfer function can be observed on the oscilloscope as a bending of the trace. One disadvantage of this technique for measuring non-linear distortion is that all linear distortion, including delay, must first be removed. Another disadvantage of this technique is that signals from both ends of the signal path under test, which may be a network with delay, must be connected to the oscilloscope. Yet another disadvantage of this technique is that the signal path's bandwidth must be wide bandwidth (wide enough to pass a fundamental component of the continuous wave signal, plus several harmonics that were created by non-linear distortion acting upon the fundamental component). The advantage of this method is that the oscilloscope trace shows a X-Y plot that displays the transfer function, illustrating the non-linear distortion. The transfer function can be evaluated to determine the coefficients (A, B, C, etc.) of the Taylor series expansion. The X-Y plot will have magnitude and phase information on both the input and output signals and will not be constrained to one quadrant of the Cartesian coordinate system.

Another prior art method that is used to test the dynamic range of a signal path is to use a broadband source of random, or Gaussian, noise followed by a notch filter device. This technique works for both wide bandwidth and narrow bandwidth systems. The noise source, which has a portion of its energy removed in a narrow frequency band by the notch filter device, is applied to the input of the signal path. As the amplitude of the notched-noise source test signal is increased, the distortion products are increased. The distortion products may be observed in the bottom of the frequency notch at the output of the signal path. The depth of the frequency notch may be measured on a spectrum analyzer as a measure of the non-linear distortion power. This test method has the advantage of showing distortion products that are created by a realistic signal loading if the normal loading is a Gaussian distribution. One disadvantage of this test method is the cost and inconvenience associated with the notch filter device. Another disadvantage of this test is that the distortion components, which are typically spread over a broad bandwidth, can only be observed in a relatively narrow frequency range, which is the bottom of the frequency notch.

The above prior art test methods have the disadvantage of requiring that the signals being transported on the signal path be interrupted so that a distortion test can be performed. Creating severe distortion by saturating or clipping a network causes a high error rate on any digital signals being transported on the signal path for the duration of the test.

Cable return signal paths are one of several applications for test systems that can measure non-linear distortion. Return cable systems use a tree and branch architecture containing level-sensitive devices such as amplifiers and laser diodes. Cable systems in the United States are increasingly bi-directional with signals in the 54–750 MHz frequency band traveling downstream from the headend to homes and signals in the 5–42 MHz frequency band traveling upstream from homes towards the headend. Because multiple upstream signal transmissions can be simultaneously accommodated from multiple homes, signals from several different signal paths may make up a composite received signal at the headend.

Determining the proper operational levels for carriers on a cable upstream system is much more difficult than determining the proper levels for carriers on a cable downstream system for two reasons. The first reason is that the signal sources originate at many different remote points and the dynamic capacity of the upstream signal path must be shared among many carriers that are in different frequency bands. The second reason is that the signal transmissions are intermittent and the availability of signals with which to measure distortion products is indeterminate. The downstream system on the other hand, has a composite signal that is comprised of many continuous signals that are historically mostly television transmissions. The downstream signal is a well-controlled transmission that originates at a single point, which is the headend. Downstream cable systems are typically operated at, or just below, signal levels that generate unacceptable levels of distortion. This practice is employed to maximize the carrier to random (Gaussian) noise ratio for the downstream carriers.

Thus there is a need to determine if the signal path associated with a return cable system is low in dynamic range because the system has been improperly aligned, or if there is a defective component in the signal path. There is also a need to measure non-linear distortion on a signal path that will probably also be contaminated with linear distortion. There is also a need to find an optimum operating level for the signals being carried on the return system. It is also desirable to measure the dynamic range of a signal path without disturbing the digital traffic being transported on the signal path.

SUMMARY OF THE INVENTION

A method of measuring non-linear distortion on a signal path by transmitting a burst reference test signal through the signal path, receiving and capturing the reference test signal including any linear and non-linear distortion created by the burst reference test signal passing through the signal path, and analyzing the captured reference test signal. Analysis is done by measuring the ratio of the energy that is correlated to the reference test signal to energy that is not correlated to the reference test signal. Alternately, a reference test signal that contains spectral holes may be transmitted and the non-linear distortion may be measured in the spectral holes of the received reference test signal. Alternately non-linear distortion may be measured by sending a two-burst reference waveform comprised of a low-level sinewave followed by a high-level sinewave. The low-level sinewave is used as a reference signal while the high-level sinewave is used to create non-linear distortion.

DRAWING FIGURES

DESCRIPTION OF THE PREFERRED EMBODIMENTS

Figure 1:
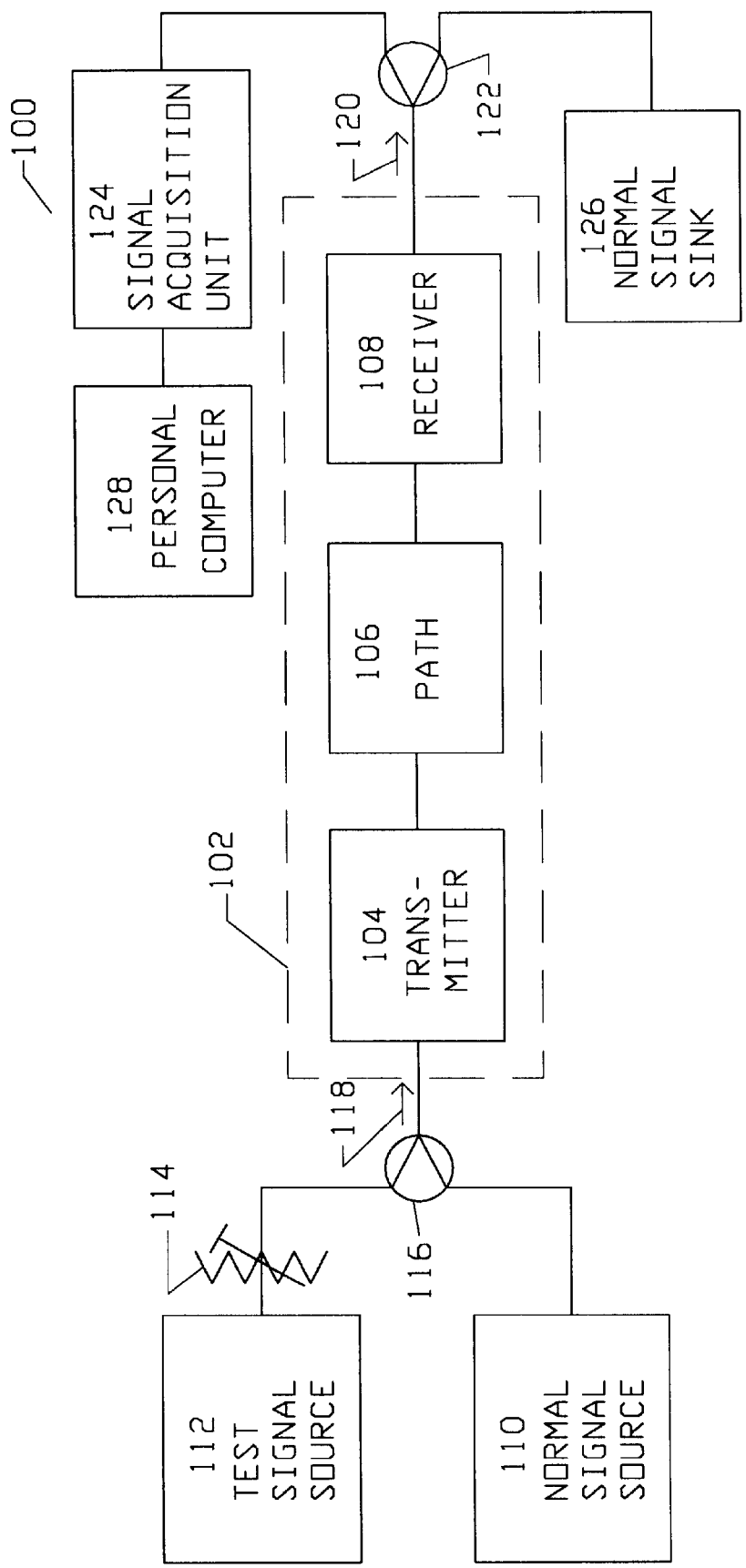
FIG. 1 is a block diagram of a test system including a signal path.

The terms impulse response, correlation, cross-correlation and auto-correlation are all known in the art. In particular, the term correlation between waveforms is a measure of the similarity or relatedness between waveforms. The book "Principles of Communication Systems" by H. Taub and D. Schilling (ISBN #0-07-062955-2) may be used for a background on digital communications.

Correlation is the similarities between waveforms that can be numerically measured by a formula:

$$R_{12}(\tau) = \lim_{T \to \infty} \frac{1}{T} \int_{-T_0/2}^{T_0/2} v_1(t+\tau)v_2(t)\,dt \quad (1)$$

Where $R_{12}(\tau)$ is the average cross correlation between two waveforms, $v_1(t)$ and $v_2(t)$.

The correlation between two waveforms may be found by a convolution in the time domain as shown in equation (1) or by processing in the frequency domain by a multiplication of frequency components in a manner known in the art.

This patent application discloses three methods of testing the signal path to measure non-linear distortion energy level as a function of a reference test signal level. In each method a burst reference test signal is transmitted through the signal path at a high signal level and captured by a digital signal acquisition unit at the receive site. The received reference test signals are processed by three digital signal-processing (DSP) techniques to reveal the non-linear distortion that was created by the reference test signal. All three techniques utilize short burst duration, thereby minimizing interference with digital carriers that may be using the signal path.

First Method

In a first method the received impaired burst test signal is processed with an unimpaired copy of the test signal to compute the amount of correlation between the two waveforms. Comparing the energy in different time intervals of the time domain impulse response can do this. One way to find the time domain impulse response is to process the received reference test signal with an unimpaired copy of the reference test signal in the frequency domain to determine the frequency response of the signal path. The frequency response result is then transformed by an inverse fast Fourier transform (IFFT) to create the time domain impulse response. From the impulse response, the distortion energy may be determined as the portion of the total energy that is uncorrelated to the transmitted unimpaired burst reference test signal.

Alternately, the impulse response can also be found by a convolution in the time domain of the unimpaired reference test signal with the impaired received signal, as mentioned above.

The time domain impulse response's energy may be split into two parts: the uncorrelated energy which is not close in time to a main peak of the impulse response, and the correlated energy that is close in time to the main peak of the impulse response. For example, if an impulse response has a duration of 20.48 microseconds, energy that is close in time to the main peak may be considered to be in a 2.048 microsecond window around the main peak of the impulse response. The rest of the energy may be considered to be uncorrelated energy that is not close in time to the main impulse. A good unimpaired reference test signal is one whose auto-correlation function produces an impulse response with most of its energy contained in and around the main peak and low energy in time periods away from the main peak. For example, a sine(x)/(x) function is a good impulse response.

If the duration of the burst reference test signal is long relative to any echoes in the channel, the uncorrelated energy will be the portion of the energy that is not close in time to the main impulse response. The correlated energy will be the portion of the energy that is close in time to the main impulse response. Correlated energy will be primarily the undistorted signal plus any linear distortion, which includes short echoes. The uncorrelated energy will be primarily the non-linear distortion. If there is no externally induced interference, a total energy will be the sum of the correlated and uncorrelated energy. Sources of externally induced uncorrelated energy might be random noise or ingressing signals, such as broadcasts from radio stations.

Any number of waveforms can be used as burst reference test signals for this test method, but not all make good reference signals. Good reference test signals have the characteristics of flat spectral energy, repeatability, high energy for distortion creation, are easy to generate, and have representative loading of the signal path. It is desirable to use a reference test signal that has a probability distribution function (PDF) that is similar to the intended composite signal that the signal path will be carrying. PDFs are histograms that are comprised of many voltage samples. Typically a bell-shaped Gaussian PDF is assumed for digital carriers that have similar distributions to random noise.

If a sample of random Gaussian noise were captured, stored and played back repeatedly it would also make a good reference test signal from a representative loading standpoint, but its auto-correlation function would probably not be ideal. A PN signal is a repeatable noise-like sequence of 1's and 0's that is typically generated by a digital logic circuit. Pseudonoise (PN) sequences are desirable because they have high power, but the sequence must be carefully chosen to have a good auto-correlation function. Reference test signals such as quadratic chirps, and the Koo waveform invented by David Koo (U.S. Pat. No. 5,179,444) both have good impulse responses. Orthogonal frequency division multiplex signals, which have all frequency coefficients set equal to create flat spectral energy, also make good reference test signals. One reference test signal that can be used is a stepped-frequency waveform. The stepped-frequency waveform can be generated by rapidly reprogramming a numerically controlled oscillator (NCO) to generate a reference test signal similar to a quadratic chirp, but with multiple step frequency increases instead of a smooth frequency increase. This stepped-frequency burst waveform is comprised of a number of smaller time intervals during which a sine wave oscillates at a constant frequency. This reference test signal is described in U.S. Pat. No. 5,990,687.

This basic time domain testing idea can be improved by processing the received burst reference test signal with a linearly pre-distorted reference test signal instead of a pure unimpaired copy of the reference test signal. When the processing is done using the linearly distorted reference test signal, linear impairments are removed but any non-linear impairments will remain. The linear distortion components are automatically removed by this processing method.

Second Method

In a second method, a reference test signal with spectral holes is transmitted. Such a reference test signal can be easily created by a modulation technique known as orthogonal frequency division multiplexing (OFDM), which is known in the art. All harmonic carriers (HC's) are created by using a fixed value for the magnitude and phase of each HC. Using zero for the values of HCs at frequencies where holes are desired creates spectral holes. The energy in the spectral holes quantifies the level of non-linear distortion. Spectral holes in OFDM waveforms are also created in a telephony digital transmission method called DMT (discrete multitone) to avoid frequencies with interference. Spectral holes in OFDM waveforms are also used on some cable upstream telephone systems to allow other users to transmit simultaneously.

Third Method

In a third method, a waveform is transmitted that is a two-burst reference waveform comprised of a first burst signal that is a low-level sinewave signal that does not clip the signal path, and a second high-level sinewave signal that clips the signal path. As the second burst signal overloads the signal path, harmonics of the fundamental frequency are created. Since the two bursts are in a fixed time relationship to each other, the first burst can be time-shifted and amplified to replicate the input signal that created the second received burst signal with non-linear distortion.

Discussion of the First Method

In patent application Ser. No. 08/999,912 titled "Test System for Measuring Frequency Response and Dynamic Range on Cable Plant" a method is disclosed to measure the frequency response of a signal path with minimal interference with the information-bearing signals that are being transported. The reduction in interference is accomplished by using a short duration burst reference test signal, which may be, for example, a PN signal. If the PN signal is transmitted at a high level and pre-filtered by a notch filtering device before transmission, the signal path may be tested for distortion-free dynamic range while only causing a minimal interference with the signals being transported over the signal path. The distortion measurement is made by capturing the reference test signal on a digital signal acquisition unit, processing the reference test signal digitally, and measuring the distortion products which will be visible in the bottom of the notch. Minimal interference with digital traffic is achieved because of two characteristics of cable upstream networks: the reference test signal mimics impulsive noise, which is a common impairment, and cable upstream networks typically recover very quickly from an overload condition. Digital carriers on upstream cable systems typically have a forward error correction capability that automatically corrects the effect of short-duration interference that may be created by impulsive noise or brief-duration burst test signals.

Description FIG. 1

FIG. 1 is a block diagram 100 showing a signal path 102. The signal path 102 may be further comprised of a transmitter 104, a path 106, and a receiver 108. Alternatively, the signal path may be any of a number of other systems containing devices with non-linear distortion characteristics, such as a laser transmitter, a fiber optic cable and an optical receiver, or an audio amplifier, a loudspeaker, an auditorium and a microphone. The path 106 may also introduce linear distortion such as delay, group delay, echoes, and amplitude tilt. A normal signal source 110 is connected to a combiner 116. A reference test signal source 112 is also connected through a variable attenuator 114 to the combiner 116. A transmitted signal 118 may originate from the normal signal source 110 and/or from the reference test signal source 112. A received signal 120 out of the signal path is split by a splitter 122 and applied to both a digital signal acquisition unit 124 and a normal signal sink 126. A personal computer (PC) 128 is connected to the digital signal acquisition unit 124. The digital signal acquisition unit captures the received reference test signal, which is subsequently downloaded to the PC 128 for processing. The digital signal acquisition unit may be a digital oscilloscope, such as the Tektronix TDS 220. Alternately, the digital signal acquisition unit may be a plug-in card that plugs into the PC. Gage and Signatec are two vendors for high-speed data acquisition cards. Triggering of the oscilloscope may be assisted by a burst trigger signal generated by the reference test signal source 112. The burst trigger signal may have a duration of 5 microseconds and a frequency of 25 MHz. This method of digital test signal acquisition triggering was disclosed in the U.S. pat. No. 5,990,637.

To perform a distortion test the reference test signal source 112 transmits a burst reference test signal through the variable attenuator 114, combiner 116 and signal path 102. The impaired reference test signal is captured on the digital signal acquisition unit 124 and downloaded to the PC 128 for processing. After processing with an unimpaired stored copy of the reference test signal, the distortion test results are displayed. If the level of non-linear distortion is below some threshold value, the test is repeated with a lower attenuation setting on the variable attenuator 114. The test signal source 112 and attenuator 114 could for example be located in a home terminal device, such as a set-top box or cable modem. The signal acquisition unit could be located in a cable headend. Details about the reference test signal and the digital signal processing are covered in the discussion of other figures.

Figure 2:
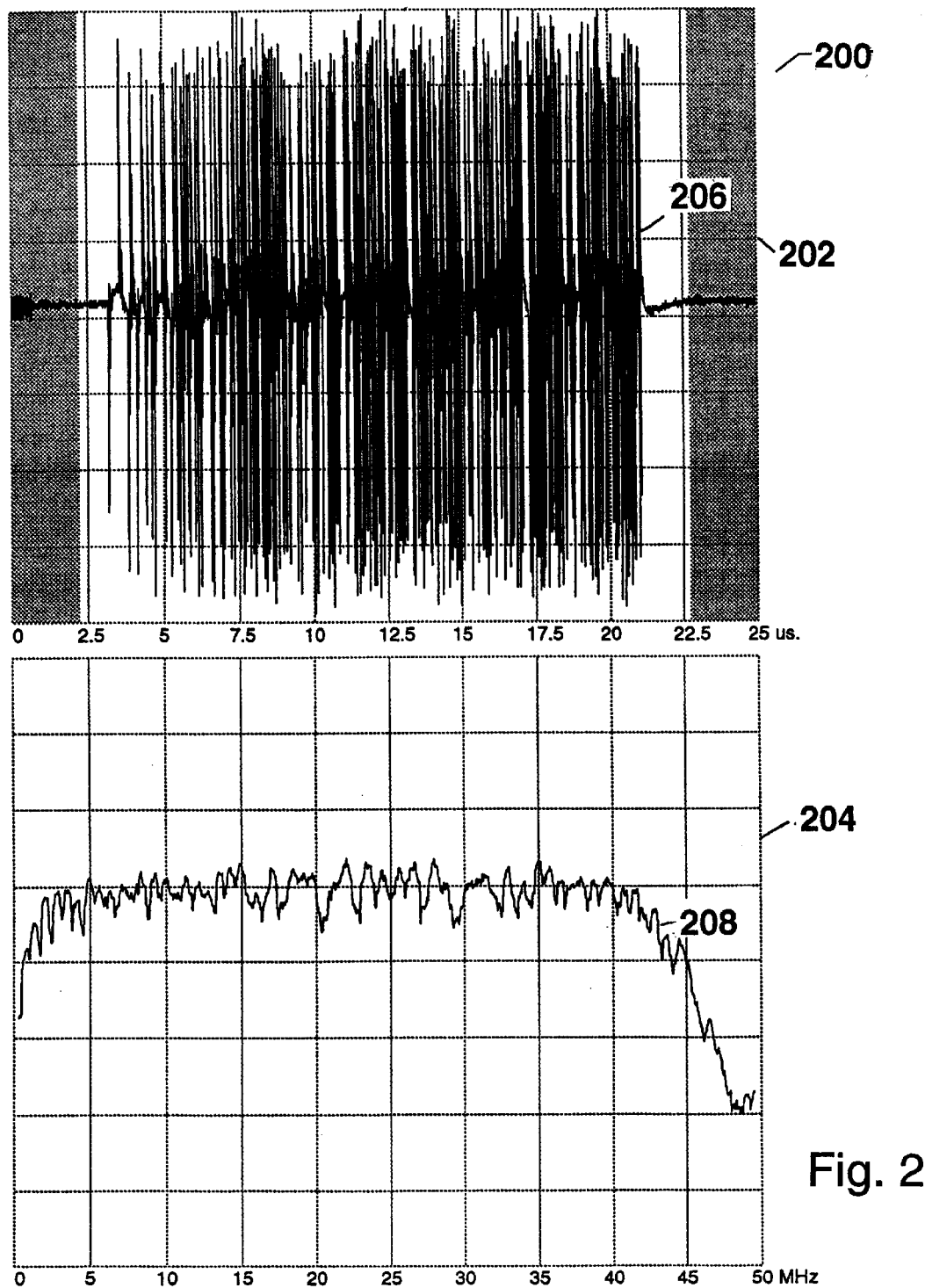
FIG. 2 is a time and frequency plot of a single unimpaired burst reference test signal that may be used to test for non-linear distortion.

Description FIG. 2

FIG. 2 is a time and frequency domain representation of an unimpaired reference test signal 200 which may be transmitted by the reference test signal source 112. This is a high-speed baseband reference test signal that may be used to test the upstream portion of a 5–42 MHz cable system. FIG. 2 is comprised of a temporal plot 202 with a temporal trace of a reference test signal 206. It is also comprised of a spectral magnitude plot 204 with a spectral trace of a reference test signal 208. The digital signal acquisition unit 124 sampled the unimpaired reference test signal with 2500 points in 25 microseconds using a sample rate of 100 megasamples per second. Only 2048 of the 2500 time domain samples were analyzed. The frequency range of the spectral plot is from 0 to 50 MHz with 1024 points providing a frequency domain sample every 48.8 kHz. The fast Fourier transform (FFT) was used to convert the temporal trace into a spectral plot. When performing the FFT, only the real values are used; zero is used for all imaginary values. Only one sideband is illustrated since both sidebands have identical magnitude plots. The spectral data is displayed as the magnitude components that have been smoothed by performing a running average on 8 samples. There is also a phase component to the unimpaired reference test signal, which is not illustrated.

Figure 3:
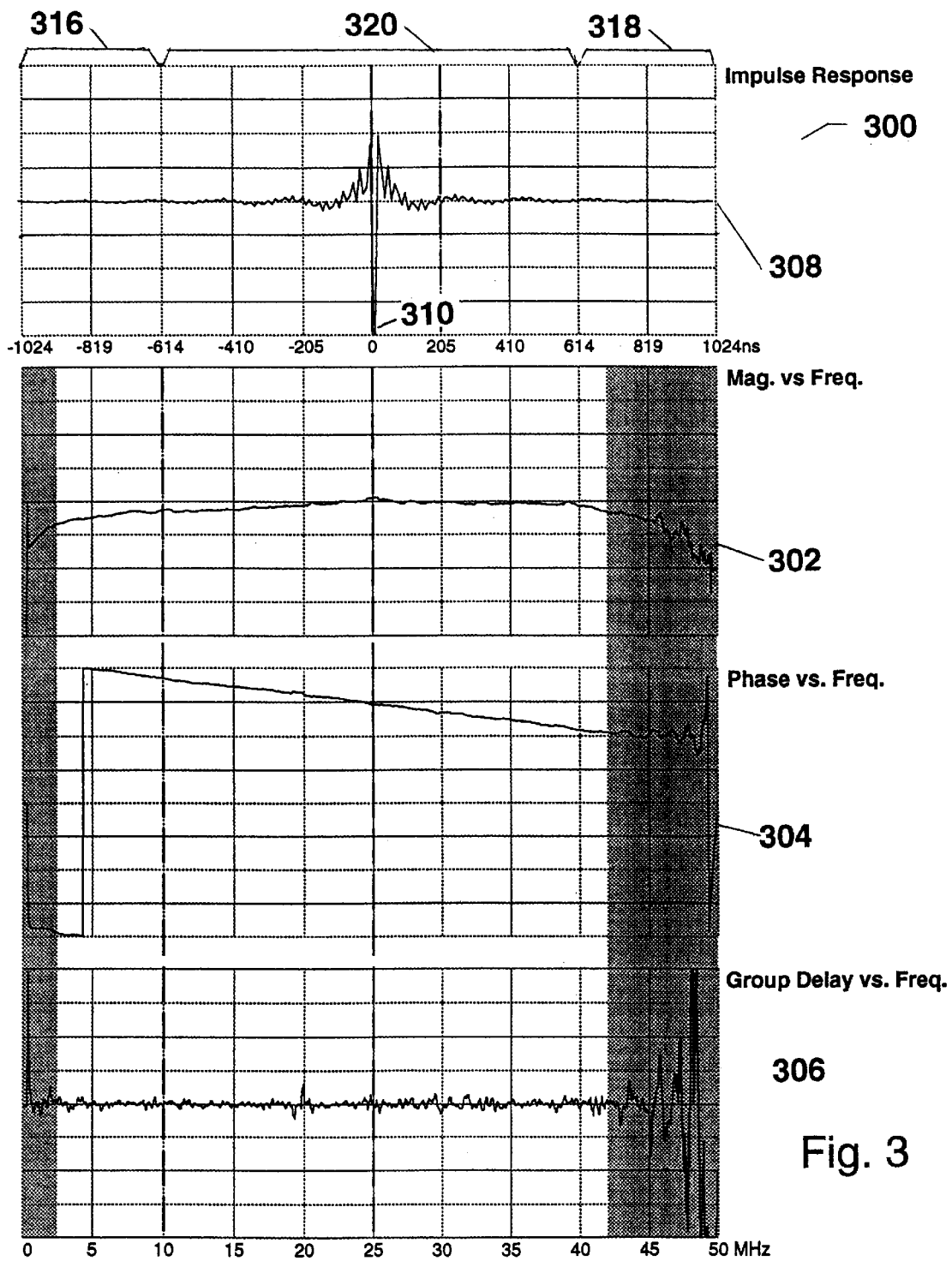
FIG. 3 is set of frequency response plots and an impulse response plot resulting from an analysis of a linearly distorted received reference test signal.
Figure 3A:
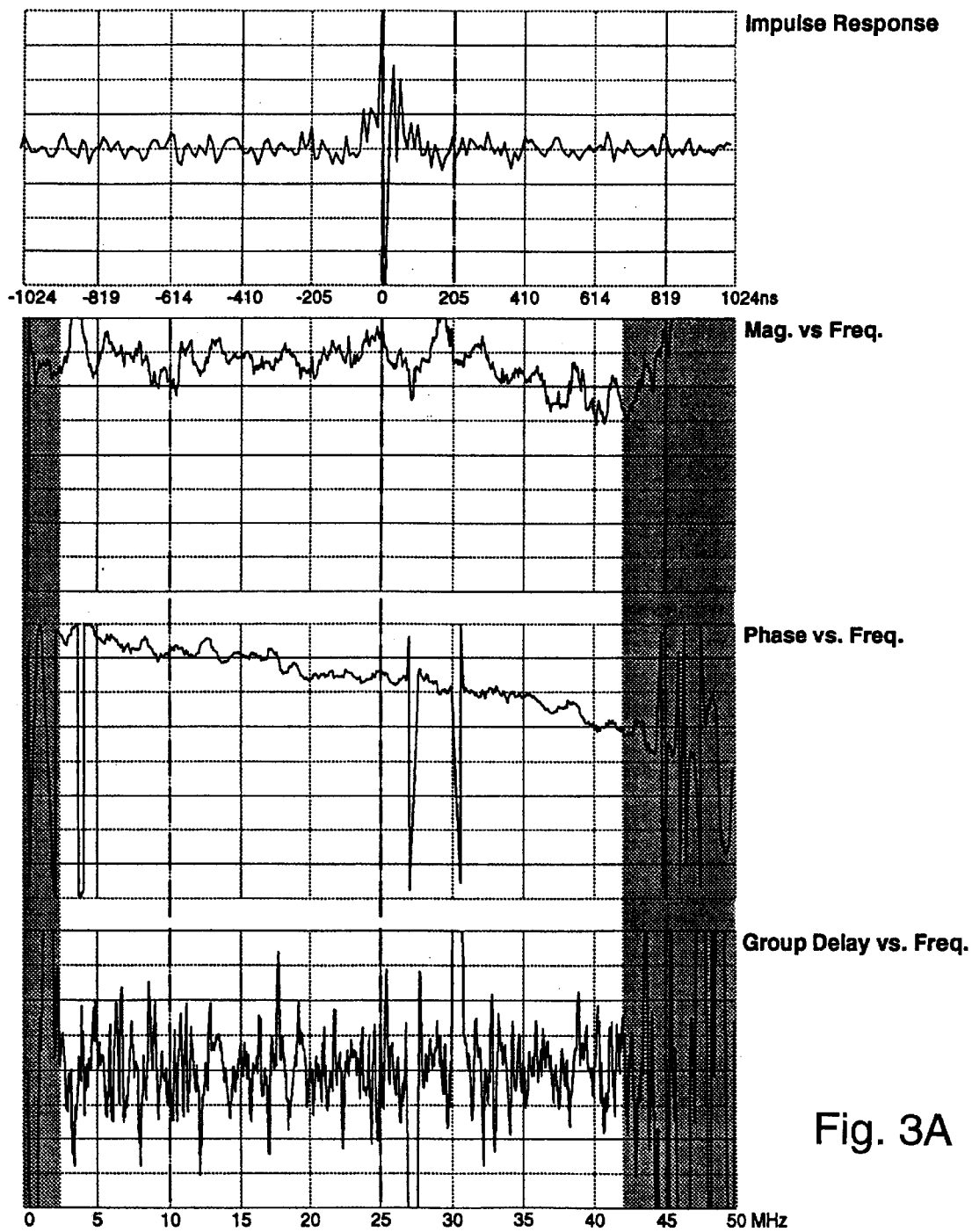
FIG. 3A is a set of frequency response plots and an impulse response plot resulting from an analysis of a received reference test signal with both linear and non-linear distortion.

Description FIGS. 3–3A

FIG. 3 is an analysis 300 of the frequency response of a signal path without significant non-linear distortion. This signal path happens to be an inverting Hewlett Packard MSA-0304 monolithic integrated circuit amplifier. The analysis consists of three spectral plots and one temporal plot. The frequency response was found by digital signal processing the received impaired reference test signal which had passed through the signal path with an unimpaired copy of the reference test signal, as will be described in the discussion of FIG. 5. The spectral plots consist of a magnitude plot 302, a phase plot 304 and a group delay plot 306. The group delay plot 306 was created from the slope of the phase plot 304. Performing an IFFT on the 2048 complex points of spectral data creates an impulse response 308, which is a temporal plot. The impulse response 308 is comprised of only real values; all imaginary values are zero. Windowing was used on the frequency domain data to make the impulse response.

The impulse response for a non-distorting signal path may be observed to contain a main impulse 310 and possibly one or more minor impulses associated with echoes that are linear distortions. In this example, the main impulse is negative because the signal path under test is an inverting amplifier, and there are no echoes evident. The energy from the main impulse may be observed to be mostly constrained to a main time period 320 containing the main impulse and any short delay echoes. The impulse response from a signal path that is not creating non-linear distortion products may be observed to also have an early time period 316 and a late time period 318 which have very low energy. What little energy there is comes from the "tails" of the main impulse or possibly any long echoes which typically have a low amplitude on cable plant. An imperfect auto-correlation function of the reference test signal will also contribute to the energy in the early and late time periods. Since the ideal shape of an impulse over a limited bandwidth signal path is a sin(x)/x waveform, the energy as an instantaneous function of time is proportional to the square of the sin(x)/x function. The variable x represents time. Thus the energy will be small at times that are far removed from the time at which the impulse response's voltage is at a peak (x=0) which is the main peak of the impulse response 308. Measuring very low levels of non-linear distortion requires a very ideal impulse response with low energy in the early and late time periods.

It should be noted that the impulse response as illustrated is only about 10% of the total impulse response time. In other words, only 204 points out of a total of 2048 points are displayed. The impulse response at the times that are not illustrated has values that are small. Also, due to the circular nature of the impulse response obtained by the IFFT method, the first point in the early time period 316 is adjacent to the point that is at the last time point in the late time period 318. The first point in the early time period is off the plot to the left and the last point in the late time period is off the plot to the right. Also note that because of the well-known circular nature of the FFT, the highest frequency in a full spectral plot is adjacent to the lowest frequency in the full spectral plot because of a phenomenon known as spectral-folding. If a signal path is not creating any linear or non-linear distortion, the impulse response should resemble a sin(x)/x response as mentioned above. If the signal path has linear distortion, such as may be caused by echoes, the main time period near the main impulse will be corrupted as a distortion of the main impulse and/or the addition of additional impulses created by the echoes. In cable networks, echoes are typically short due to the loss or attenuation of the coaxial cable, so any echoes will be close in time to the main impulse 310.

If the signal path is generating non-linear distortion, the energy associated with the non-linear distortion will be generally uncorrelated with the undistorted reference test signal. This means that the energy from the non-linear distortion will be spread out over the entire 2048 point time period including the early time period 316, the main time period 320 and the late time period 318. Thus, the condition of clipping (the generation of non-linear distortion) can be ascertained by measuring the energy in the early and late time periods and comparing it to the energy in the main time period which contains the main impulse 310. The energy associated with an impulse response is measured in a time period by squaring and adding the voltage magnitude of each individual unit time sample. Thus, a measure can be made of the ratio of energy that is close to the main impulse to energy that is not close to the main impulse. This ratio will be approximate the ratio of the undistorted and linearly distorted energy to the non-linearly distorted energy in the received reference test signal.

Alternately, in a preferred embodiment, an energy ratio measurement can easily be made of the ratio of total energy to the non-linear distortion energy in the 2048 processed samples of the received burst signal:

$$R = \frac{E_{TOTAL}}{E_{NLD}}$$

Where R is the energy ratio of energy from total energy ($E_{TOTAL}$) to non-linear distortion ($E_{NLD}$). Most of the correlated energy can be found to be in the main time period, and most of the uncorrelated energy can be found to be in the early and late time periods. A correction may be made to the energy measurements to improve the accuracy. This can be done by assuming that the non-linear distortion (uncorrelated) energy is uniformly distributed in the 2048 time samples and correcting the uncorrelated energy to account for the fact that some percentage of the samples (those associated with the main time period) were discarded. For example, assume that there are a total of 2048 time samples, and the main time period is 204 samples, the early time period is 922 samples and the late time period is 922 samples. The energy from the early and late time periods must be multiplied by 1.111 (10/9) to correct for the missing time, which is 10%.

FIG. 3A is a set of plots for a signal path, consisting of the monolithic amplifier, that has been overdriven and is generating non-linear distortion. It can be noticed that the frequency domain data is rough or coarse. Non-linear distortion products adding a vector error to the magnitude and phase of the individual frequency components cause this roughness. Also note that the impulse response has had energy added to the early and late time periods. The energy ratio may be calculated as the energy in the early and late time periods divided by the total energy in the processed burst signal.

One skilled in the art may recognize that random noise or other unrelated signals ingressing into the cable system may be observed to also have uncorrelated energy like the non-linear distortion components. If this problem occurs, and the frequency of the interference is constrained to a relatively narrow frequency band, it can be remedied by filtering out (removing) the undesired energy in the frequency domain before obtaining the impulse response by performing the IFFT. When performing a filtering function, it is advisable not to use abrupt filtering functions in either the time domain or the frequency domain, as they cause ringing in the resultant transform. A window function, such as an elevated cosine wave, applied to the frequency domain data before the transform, will reduce ringing and remove the narrow band interference. Windowing also produces a better impulse response and should be applied to the frequency domain data at frequencies around the band edges, such as 5 and 42 MHz. Windowing is a technique that is well known in the art. Averaging, as will be discussed later, can also reduce the effect of unrelated noise. Typically low levels of random noise will affect the distortion measurements at very low distortion levels.

Figure 4:
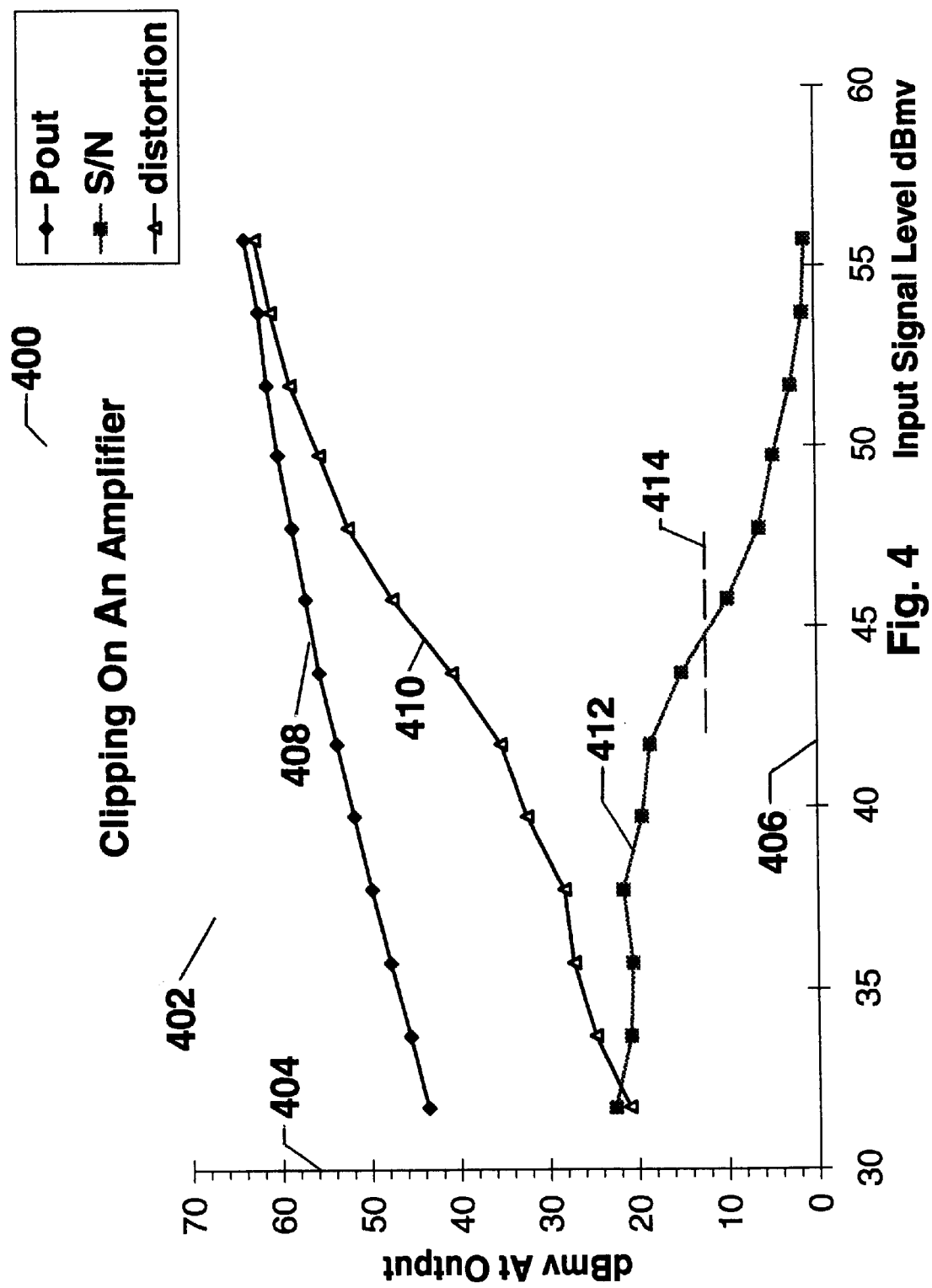
FIG. 4 is a set of plots of showing an increase in distortion components and a decrease in a signal to distortion ratio as a reference test signal is elevated.

Description FIG. 4

FIG. 4 is a plot 402 that contains a number of traces. The traces were obtained by increasing the reference test signal level, measuring the energy in the main time period, the energy in the early plus late time periods, and computing the energy ratios. The traces show the creation of distortion products in the Hewlett Packard MSA-0304 monolithic IC amplifier that was driven into distortion by the reference test signal illustrated in FIG. 2. A vertical axis 404 is the power level in decibels above a millivolt. A horizontal axis 406 is the reference test signal input power level. A first output signal trace 408 shows a bending as the input level is elevated. This bending is caused by compression of the reference test signal. This trace is the total energy in the burst signal. An output distortion trace 410 shows the energy of the non-linear distortion components created by the reference test signal as the test signal's input is elevated. This trace is the energy in the early and late time periods. An energy ratio trace 412 shows a decrease in the ratio of total energy to non-linear distortion energy as the reference test signal's input is elevated. This trace is the dB difference between the output signal trace 408 and the output distortion trace 410. A threshold level 414 may be chosen to define the maximum input for which the distortion is acceptable. The nature of the reference test signal will affect the output power level at the threshold level.

Some signal paths, such as signal paths having laser diodes, have abrupt rises in the output distortion trace. The monolithic amplifier illustrated in FIG. 4 has a relatively gradual increase in the output distortion trace as the input reference test signal is increased in level. The effective number of bits (ENOBs) that the digital signal acquisition unit has, along with a non-perfect impulse response associated with the PN sequence reference test signal limits the ability to measure low levels of distortion. The digital oscilloscope, which was used as the digital signal acquisition unit to obtain the data of FIG. 4, had an ENOBs of only about 6.2.

It should be noted that multiple types of repeatable signals might be used to perform this test other than the PN sequence illustrated in FIG. 2. For example, the stepped-frequency reference signal described in U.S. Pat. No. 6,140,822 could be used as well as the Koo signal, a quadratic chirp, repeatable Gaussian noise, or a repeatable signal comprised of multiple carriers captured from real upstream signals. The repeatable signals may be stored in a programmable read only memory and clocked into a digital-to-analog converter, in a manner known in the art.

Figure 5:
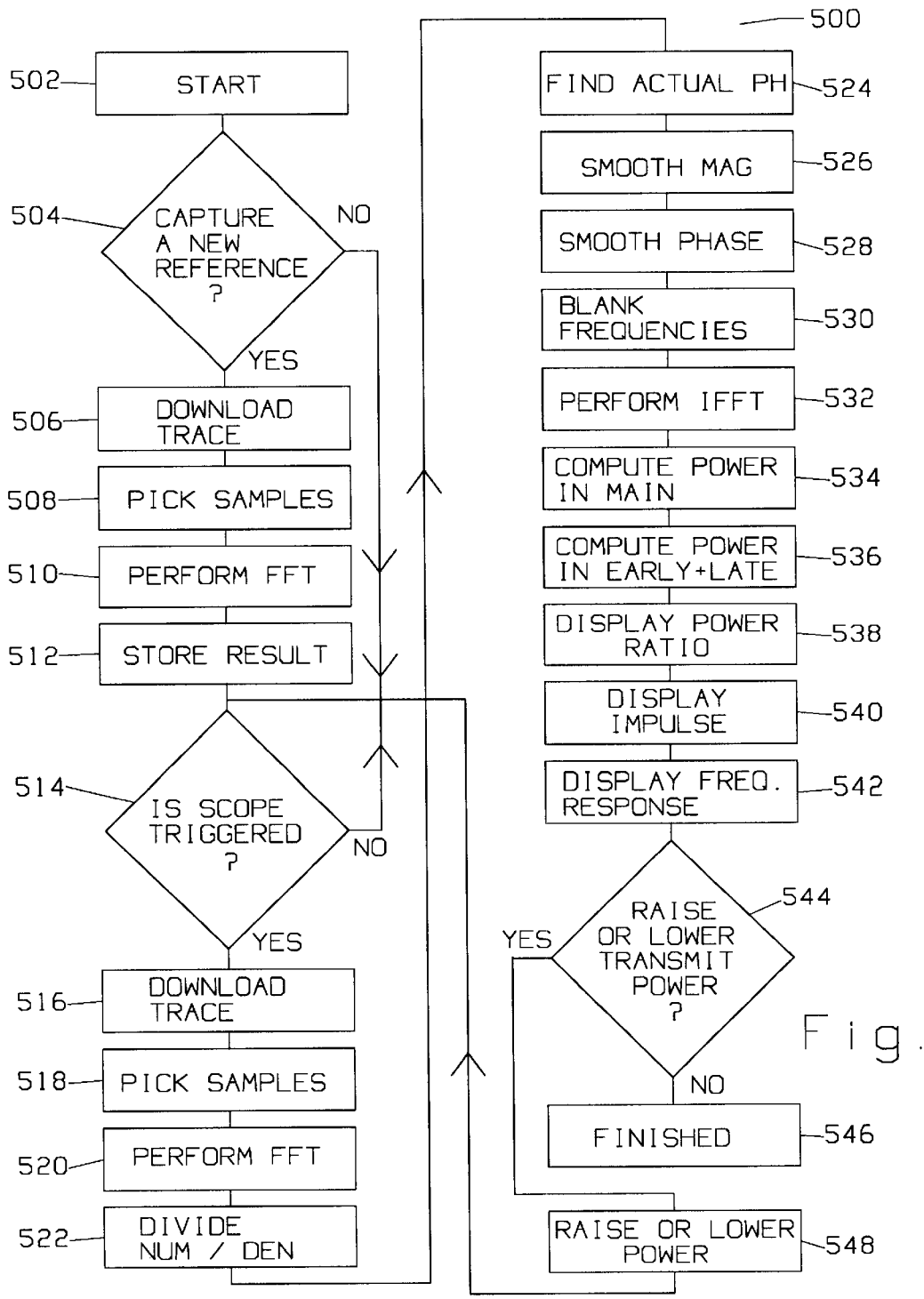
FIG. 5 is a process diagram for finding distortion products from a distorted received reference test signal.

Description FIG. 5

FIG. 5 is a software flow diagram 500 that illustrates the process of finding a frequency response and an impulse response from an unimpaired time domain burst reference test signal and an impaired received time domain burst reference test signal. The software may run on a digital signal processing integrated circuit, such as the Texas Instruments TMS320C30, on a personal computer, on a workstation, or on an embedded processor. The process starts at a step 502. At a step 504 the technician may choose to capture a new copy of the unimpaired burst reference test signal. If a previously stored copy of the unimpaired burst reference test signal is used, the process continues at a step 514. If a new copy of the unimpaired burst reference test signal is chosen, a technician connects the transmitter device directly to the digital signal acquisition unit and transmits an unimpaired burst reference test signal directly into the digital signal acquisition unit 124. This is typically done when the transmitter and receiver are both in the same physical location. The new trace is downloaded from the digital signal acquisition unit into the PC in a step 506 and stored on a hard drive.

The fast Fourier transform (FFT) is a discrete linear transform that can be used to transform a block of time domain data points into a block of frequency domain data points. The inverse fast Fourier transform (IFFT) performs an inverse transformation with a block of frequency domain data points to a block of time domain data points. The FFT and IFFT use complex numbers and are well known in the art. The manner in which the FFT operates on blocks of discrete complex data is also well known in the art. The data points comprising the data blocks in both the time and frequency domain have coefficients which are complex numbers. The data points may be described as terms with coefficients, which are the values of the terms. The FFT is a discrete transform, and the size of the data block is typically two raised to some integer power, such as 2048 or 4096.

In a step 508, the samples that will be used in a first FFT are chosen from the total number of samples captured. The number of data points downloaded may be 2500, but the number of data points used by the FFT is nominally 2048. The FFT is used to convert the time trace into the frequency domain. The software source code to do a FFT may be found in "C Language Algorithms for Digital Signal Processing" by Embree and Kimble (ISBN #0-13-1334406-9). The entire 18 microsecond PN reference test signal burst transmission is captured between the first and last data points of the data block that is to be transformed. The accuracy of the resulting frequency domain data is reduced if a portion of the PN sequence in the unimpaired burst reference test signal falls outside of the 2048-point transform block. The unimpaired burst reference test signal is transformed using the FFT in a step 510 to create an unimpaired frequency domain data block. The transform yields 2048 complex data points of frequency domain data, which are stored in a semiconductor memory and/or disk memory in a step 512.

In the step 514 the digital signal acquisition unit is interrogated by the PC to determine if it has been triggered and is holding an impaired received burst reference test signal. If it has not been triggered, the trigger status is rechecked in about 1 second. If the digital signal acquisition unit has been triggered, the captured impaired reference test signal is downloaded in a step 516. In a step 518 the impaired samples to be used in a second FFT operation are chosen, and in a step 520 the second FFT is performed on the impaired burst reference test signal to create an impaired frequency domain data block. In a step 522 the impaired frequency domain data block is divided by the unimpaired frequency domain data block on a frequency-by-frequency basis. That is, each complex coefficient in the impaired frequency domain data block is used in a numerator, and each corresponding complex coefficient in the unimpaired frequency domain data block is used as a denominator. This yields a frequency response data block comprised of 2048 complex data points, which are quotients. However, since zero was used for the coefficient value on all of the imaginary time-domain coefficients, only 1024 of the data points contain unique frequency domain information. As an example of complex division, if a numerator (impaired) coefficient of the 100th term is 1.2 at an angle of +30 degrees, and the denominator (unimpaired) coefficient of the 100th term is 0.6 at an angle of +10 degrees, the frequency response at the 100th frequency sample is 2.0 (1.2/0.6) at an angle of +20 degrees (+30–10).

In a step 524 the frequency domain data block is counted for rotations. This is done to calculate the actual phase angle, which may be thousands of degrees, from the raw data, which presents angles only between −180, and +180 degrees. Raw data is data that has not been fully processed for the frequency response. Subtracting the phase angles at 2 adjacent frequencies does determining rotations. If the phase difference is >+180 degrees it is assumed that a positive rotation has occurred. If the phase difference is <−180 degrees, it is assumed that a negative rotation occurred.

At a step 526 the frequency response magnitude data is smoothed to be more revealing and easier to read. The smoothing is accomplished by using the coefficients of data points that are at neighboring frequencies. Neighboring frequencies have small numerical frequency differences from each other. Smoothing may be necessary because the signal to noise ratio of the impaired received burst reference test signal is insufficient, or because of quantizing noise in the A-D (analog to digital) converter in the digital signal acquisition unit. Likewise, PN sequences do not have uniform energy at all frequencies and some frequencies have very low energy. If a frequency coefficient with low energy is used in the denominator of a complex division, it will cause a resultant increase in any noise component in the numerator frequency coefficient. With smoothing, noise at any frequency with low energy has very little bad effect on the overall smoothed result since it contributes very little to the numerator. It is also very useful to apply smoothing to the phase result, as illustrated by a step 528.

An inverse FFT (IFFT) may be used to convert un-smoothed frequency domain data into the time domain in order to create an impulse response. In preparation for doing the IFFT, at a step 530, coefficients are zeroed at frequencies that have high noise or uncorrelated signals such as ingressing broadcast signals or data signals. For example, in a 5–42 MHz return system, the coefficients of frequencies below 7 MHz, which may be noisy, may be forced to 0 to improve the result. Zeroing should be done by applying a window to the frequency domain data to avoid "ringing" in the impulse response. One windowing function that may be used is a raised cosine. In a step 532 the IFFT is taken on the frequency domain data, which is un-smoothed, but may have zero energy at chosen frequencies. The resulting real coefficients will contain the impulse response, and the resulting imaginary coefficients will all be zero.

At a step 534 the power is computed in the main time period by squaring the voltage of each individual impulse value and adding them together. At a step 536 the power is computed in the early and late time periods by squaring the voltage of each impulse value in the early and late time periods and adding them together. In a step 538, the ratio of the power in the main time period to the power in the early plus late time periods is calculated and displayed. The displayed power may be represented in decibels or a simple numerical ratio. At a step 540 the impulse response is displayed.

If desired, the energy in the main time period may be optionally zeroed-out in the time domain (again using windowing techniques) and the resulting early and late time periods transformed back into the frequency domain via the FFT. The resulting FFT will show the spectral energy of the distortion products.

At this point processing continues to a step 542 where the frequency response is displayed as magnitude, phase, and group delay plots. If the received reference test signal is distorted, the plots will take on a rough appearance similar to the magnitude plot in FIG. 3A.

At a step 544 the operator is given a choice to raise or lower the transmitted power. If no change is made, the test is finished at a step 546. If more or less power is desired, processing continues at a step 548 where the transmitted power is raised or lowered. After the power is reset, processing continues at the step 514.

The test for the presence of non-linear distortion is done by removing the main impulse plus any linear distortion components from the total energy; what remains is non-linear distortion if there is no extraneous energy in the channel, such as ingress or data signals being carried. This technique runs into difficulty if the linear distortion is caused by long-delay echoes, such as might be encountered in a terrestrial HDTV broadcast channel. The difficulty arises because the long-delay linear distortion moves out of the main time period and into the late time period. This situation can be remedied by capturing a burst reference test signal with the linear distortion, but without the non-linear distortion, and using it as the reference test signal instead of the unimpaired reference test signal. The capture can be done by reducing the transmitted reference test signal power to the point where there is negligible non-linear distortion and using the received burst reference test signal as the 'unimpaired' reference, even though it is contaminated with linear distortion. When the frequency response analysis is done, the linear distortion will automatically be canceled leaving only the non-linear distortion components plus the main impulse. This technique will work if the linear distortion is added after the non-linear distortion has been added.

The plots of FIGS. 2, 3, and 3A were generated by Cable Scope® which is a commercially available test system for measuring linear complex frequency response in the 2.5 to 42 MHz frequency band. Cable Scope has been modified to also measure non-linear distortion by the method disclosed in this application. The Cable Scope normally captures and stores a burst test signal transmission to use as the unimpaired reference test signal for processing as the denominator in the 11th step 522. This is normally done through a direct coaxial cable connection between the reference test signal source and the digital signal acquisition unit. An unimpaired reference test signal was used as an input to generate the plot of FIG. 3, which shows linear distortion only. In particular, FIG. 3 shows that the amplifier under test has a slight roll-off at the upper and lower ends of the frequency band. It also shows the amplifier is an inverting type. Both of these characteristics are linear distortions. If the reference test signal that is to be used for processing as the denominator in the 11th step 522 is captured after it has passed through the amplifier under test (signal path) at a low signal level, the linear distortion will be automatically canceled on successive analysis plots. This allows the non-linear distortion components to be observed and measured without the effects of linear distortion.

Another way the effects of linear distortion can be removed from the non-linear analysis is by sending a series of bursts adjacent to each other but at increasing power levels. With this method, the first burst is captured and used as reference test signal with which to process the successive higher-power bursts that will be contaminated with increasing levels of non-linear distortion. This technique is based on the idea that if the reference test signal level is low enough, all terms in the Taylor series expansion except the first one (with a coefficient of 'A') can be ignored. Thus, a first burst reference test signal may be transmitted at a level of 0 dBm and a second burst test signal may be transmitted at a level of +5 dBm, a third at +10 dBm, a fourth at +15 dBm and a fifth at +20 dBm. Upon reception, each burst is attenuated until all the bursts are leveled. That is, the first burst is attenuated by 0 dB, the second burst is attenuated by 5 dB, the third by 10 dB, the forth by 15 dB and the fifth by 20 dB. Next, the frequency response is computed using the first received burst, which is contaminated only with linear distortion, as the reference. The flow diagram of FIG. 5 may again be used with the exception that the unimpaired reference test signal is replaced with a linearly distorted reference test signal.

If the effect of linear distortion is removed from the impulse response, the width of the main time period may be reduced because the impulse response "settles down" quicker.

Unfortunately, with this technique, the presence of a high background noise will cause a poor quality impaired reference test signal to be captured making it difficult to distinguish non-linear distortion from background noise. Background noise may be caused by legitimate test signal transmissions, ingress into the cable system, or random noise. There are two ways to alleviate the problem.

The first approach is to simply quantify the background noise as uncorrelated energy and then note the increase in uncorrelated energy when the reference test signal with distortion is present. Simply simply capturing background noise without any transmitted burst reference test signal and performing power measurements on the background noise alone can quantify the background power.

The second approach is to average. Averaging, where several background noise-contaminated reference test signals are captured and used to form an average, will reduce the effect of the background noise allowing non-linear distortion to be clearly measured. Averaging may be used in noisy channels to improve the quality of the linear channel characterization. Since non-linear distortion is also repeatable, averaging can also be used to reduce the effect of background noise on non-linear distortion measurements. While both non-linear distortion and background noise that is uncorrelated to the reference test signal will show up as energy in the early and late time periods, there is a difference: on succeeding tests, the pattern of the non-linear distortion components will be stationary while the pattern of the unrelated background noise will move. Thus, averaging can be used to reduce the effect of the random background noise in the early and late time periods.

Averaging can be done by transmitting several bursts and computing the impulse response for each one, followed by a summation of the values at each impulse response time sample, followed by a division of each sum by the number of samples. One technical difficulty that will be encountered is variability in the sampling start times for capturing each distorted test signal. This problem causes the time sample in which the main impulse peaks to move slightly from sample to sample, thereby distorting the average impulse response. Transmitting several test signals in a large continuous block and capturing them as a large continuous block using a digital signal acquisition unit with deep memory can remedy this problem. In a preferred embodiment there may be dead-air time between the individual reference test signals.

Discussion of the Second Method

Orthogonal frequency division multiplexing (OFDM) is a transmission system that is known in the art. This data transmission technique uses blocks of data that consist of many smaller harmonic carriers (HC), each with a different frequency. The individual HCs are orthogonal to each other because they are all integer multiples of a fundamental harmonic. OFDM burst transmissions can be used as reference test signals if they are repeatable. Repeatable implies that the signal is fixed and does not transport digital data. OFDM reference test signals can be used to measure non-linear distortion by inserting a zero-value for the carrier magnitude at one or more test frequencies spread over the occupied bandwidth. Energy, which is created by non-linear distortion at these zero-value test frequencies, may easily be measured in the received signal. If a guard interval is used on the OFDM block, and the guard interval is longer than the longest echo in the test signal path, intersymbol interference (ISI) will be eliminated between the HCs with energy and the zero-value carriers. This is because the time domain guard interval maintains orthoganality between HCs in the presence of echoes.

Figure 6:
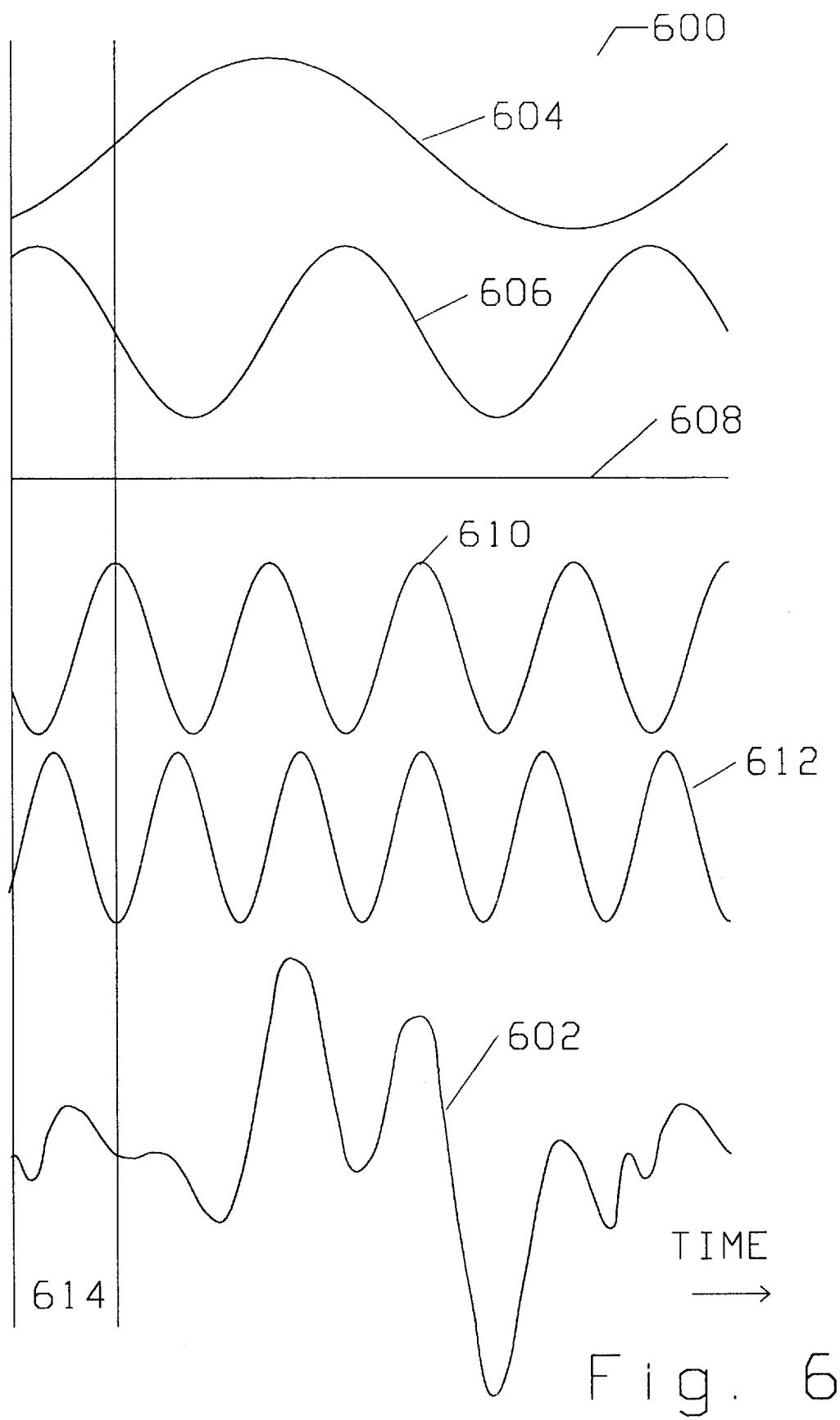
FIG. 6 is a time-domain waveform for an OFDM reference test signal.
Figure 7:
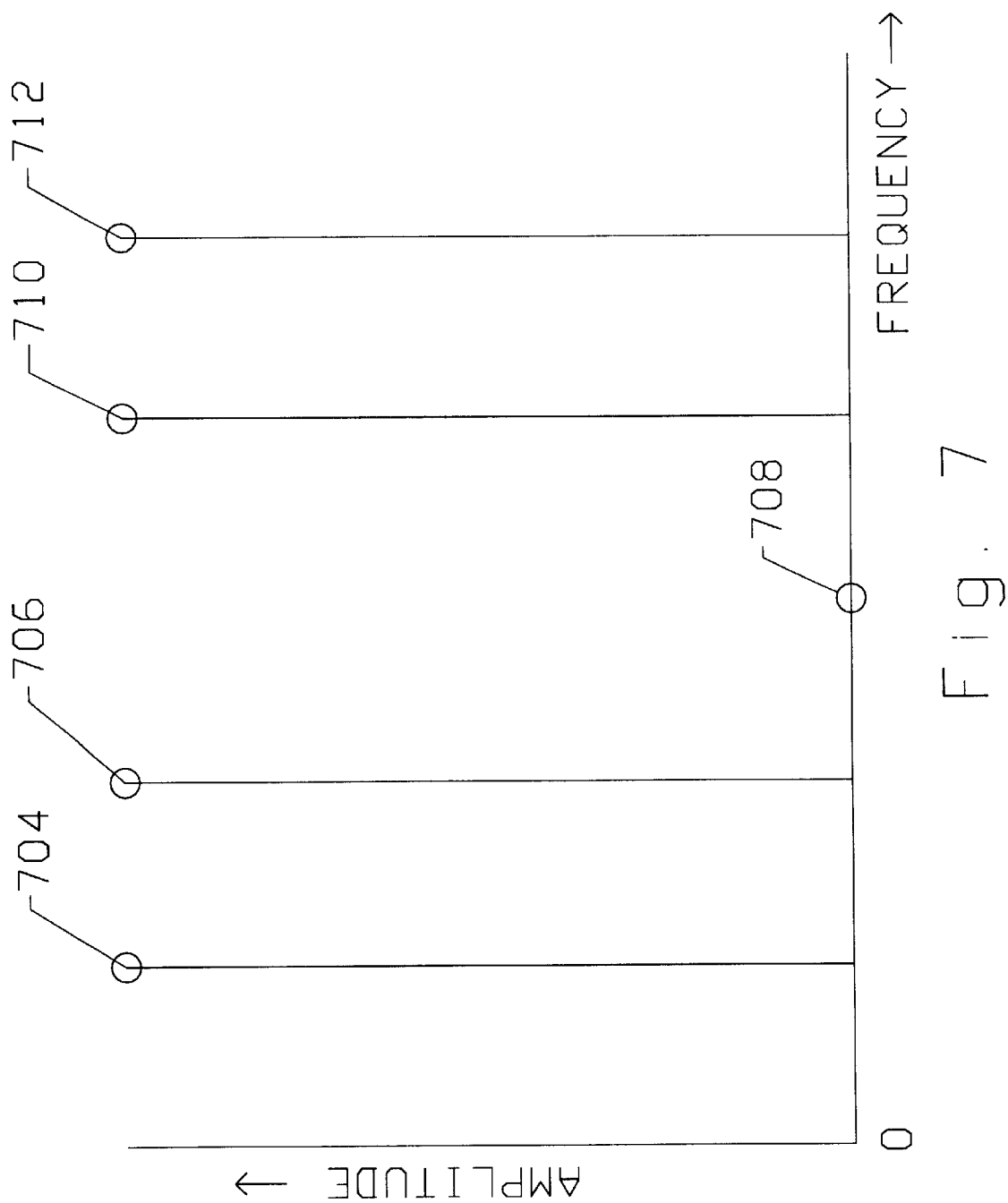
FIG. 7 is a spectral plot for the OFDM reference test signal.

Description FIGS. 6–7

FIG. 6 is a temporal diagram of an OFDM signal 600 showing the construction of an OFDM reference test signal with only five harmonic carriers, one of which is zeroed out thereby creating a spectral hole. Typically a few hundred to a few thousand carriers make up a burst OFDM signal. A composite OFDM waveform 602 is a sum of a first HC 604, a second HC 606, a third zero-valued HC 608, a fourth HC 610, and a fifth HC 612. Cutting time samples from the end of the composite waveform and pasting them onto the front form a guard interval 614. If the OFDM signal is carrying data, the magnitude and phases of the HCs are varied as a modulation method. If the OFDM signal is a reference test signal, the magnitudes and phases of the HCs remain fixed and are repeatable.

FIG. 7 is a spectral diagram of an OFDM signal 700 that shows the magnitude of the individual HCs of the composite OFDM waveform 602. A FFT may be used to convert the temporal samples to spectral samples. FIG. 7 shows a first HC 704, a second HC 706, a third HC 708, a fourth HC 710, and a fifth HC 712. If non-linear distortion is present in the waveform, the third HC 708 will not have a value of zero. Likewise, the magnitude of the other four non-zero HC will be affected by both linear and non-linear distortion. Thus the power of the third HC 708 can be measured relative to the other carriers to indicate the presence of non-linear distortion. In practice many more HCs would be used along with many more-zero-valued HCs. After summing the energy found in each of the spectral holes distributed through the test spectrum, the energy must be factored for the energy that lands on frequencies containing HC's. For example, if 10% of the frequencies are spectral holes, the energy measured in the spectral holes must be increased by a factor of 10 for the total distortion energy.

Averaging may also be used to reduce the effect of background noise on OFDM reference test signals. Averaging may be done by performing a vector addition on the distortion energy in the holes, followed by a complex division. The non-linear distortion components at each HC frequency will add on a voltage basis, while the background noise typically will add on a power basis.

Essentially, this test method would simulate, in a test OFDM data block, one or more very steep ideal notch filters. Likewise, multiple adjacent frequencies could be zeroed out together, simulating a wide and sharp notch filter function.

Note that the distortion measurement technique described in this patent application has been primarily described by baseband waveforms. Linear modulation techniques such as single sideband, double sideband, vestigial sideband, and quadrature amplitude modulation (QAM) may also be used to measure distortion over radio frequency (RF) and intermediate frequency (IF) signal paths. Linear modulation and demodulation technology is well known in the art. Thus the baseband waveforms may be used to modulate RF carriers and the demodulated signals may be analyzed for non-linear distortion by the above-described techniques. Note that modulated signals are typically narrow-band signals; so third-order distortion will be the main component in the non-linear distortion.

Description of the Third Method

A third method utilizes a two-burst waveform to create a transfer function of output voltage versus input voltage. The third method works only on wide bandwidth signal paths.

Figure 8:
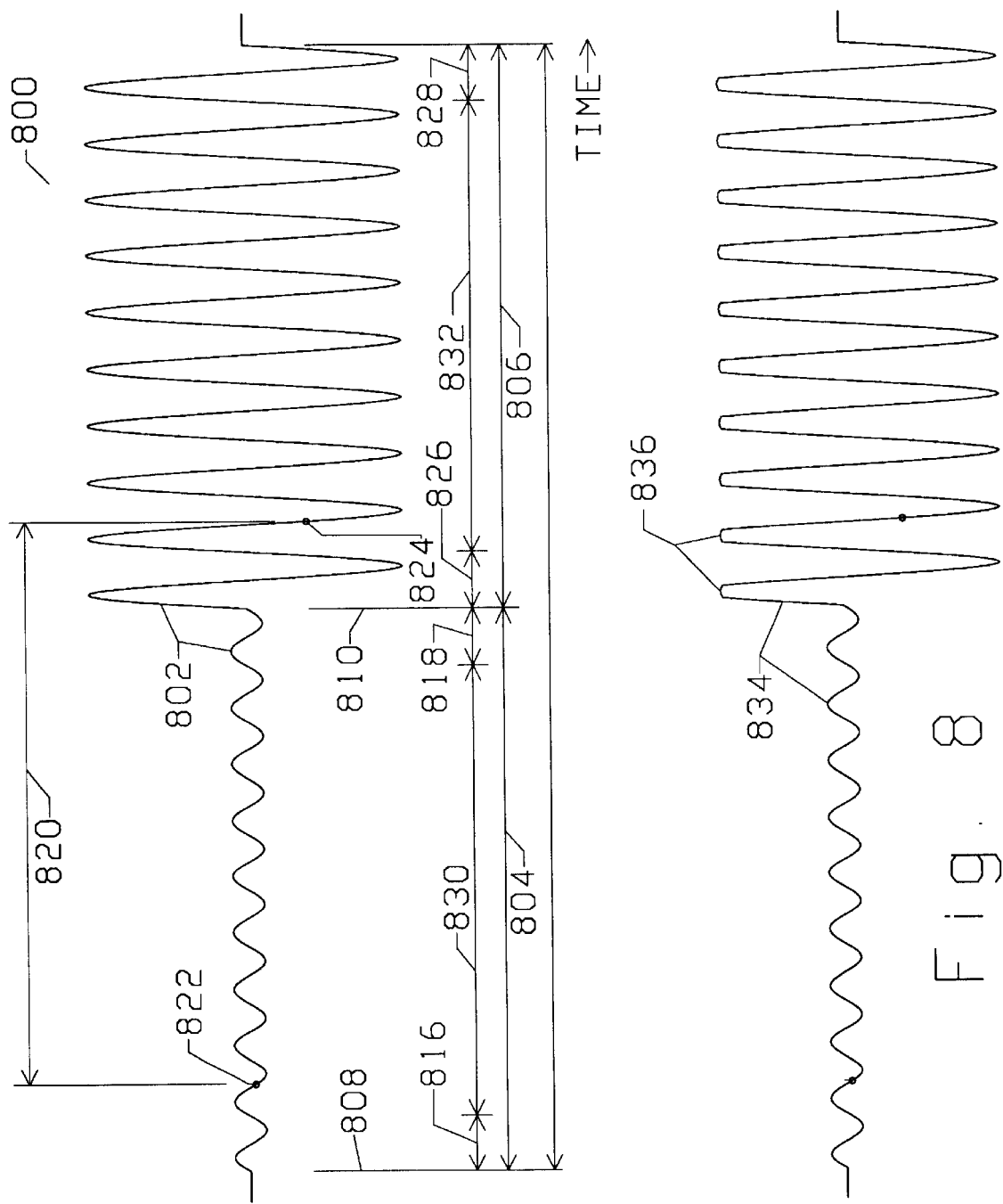
FIG. 8 is a time-domain waveform for a two-burst reference waveform comprised of a low-level sinewave signal followed by a high-level sinewave signal.

Description FIG. 8

FIG. 8 is a temporal plot 800 showing a transmitted unimpaired two-burst waveform 802 on the top half and a received clipped two-burst waveform 834 on the bottom half. The two-burst waveform 802 is a two-amplitude sinewave comprised of a low-level sinewave at a first time 804 followed by a high-level sinewave at a second time 806. A first beginning time 808 of the low-level sinewave and a second beginning time 810 of the high-level sinewave are in a fixed time relationship to each other, and both sinewaves oscillate at a same fundamental frequency. The low-level sinewave at the first time 804 and the high-level sinewave at the second time 806 may both be observed to have an integer number of cycles over a low-level capture period and a high-level capture period 832 respectively. There is also a first beginning guard interval 816 (or cyclic extension) and a first ending guard interval 818 for the low-level sinewave and a second beginning guard intervals 826 and a second ending guard interval 828, for the high-level sinewave. (A guard interval is formed by copying a portion of waveform from the end or beginning of a waveform and pasting it onto the front of the waveform, as in the OFDM waveform embodiment). The guard interval's time is chosen to be longer than the delay of the longest expected echo in the signal path. The use of a guard interval also allows some error or tolerance to the start time of the capture periods. A time shift 820 can be defined as a time delay $t_{DLY}$ between a point 822 on the low-level sinewave and corresponding point 824 on the high-level sinewave that is at the same-phase angle.

A fundamental frequency was chosen with a low frequency so that the system, which may be a upstream cable system with a frequency range such as 5–42 MHz, will pass several of the harmonics which are created by non-linear distortion. The amplitude of the low-level sinewave was chosen to avoid a creation of distortion products, while the amplitude of the high-level sinewave was chosen to create distortion products, which will be harmonics of the fundamental frequency. The amplitude of the low-level sinewave is in a fixed relationship to the amplitude of the high-level sinewave. An attenuation factor can be defined as the ratio of the amplitude of the high-level sinewave to the amplitude of the low-level sinewave, which could be 10.0 (20 decibels) as an example. To continue an example, a fundamental frequency could be 7.8125 MHz, a low-level capture period 830 could be 10.24 microseconds giving 80 cycles, and a high-level capture period 832 could also be 10.24 microseconds giving exactly 80 cycles. The guard intervals could all be 1.02 microseconds, giving approximately 8 cycles. Note that only 10 cycles of both the low-level sinewave and 10 cycles of the high level sinewave are illustrated for clarity in FIG. 8.

Continuing the example, the clipped two-burst waveform may be captured by a digital signal acquisition unit capturing voltage samples a rate of 100 mega-samples per second. Thus, the time shift 820 will be comprised of exactly 1228 samples (10.24 microseconds plus 1.02 microseconds times two for both guard intervals, using a sampling period of 10 nanoseconds).

When this unimpaired two-burst waveform 802 is passed through a signal path, both halves of the received two-burst waveform are received on a digital signal acquisition unit as a single continuous received trace 834 illustrated in the lower portion of FIG. 8. The low-level sinewave part of the two-burst waveform arrives without much non-linear distortion because it does not clip the active devices in the signal path, but the high-level sinewave portion of the continuous receive trace 834 arrives with significant distortion shown as a clipping 836 of the waveform. Both the low-level sinewave and the high-level sinewave will be linearly distorted, but only the high-level sinewave will contain significant non-linear distortion. In particular, in addition to a fundamental frequency of 7.8125 MHz, a second harmonic at 15.625 MHz will be created, as well as a third harmonic at 23.4275 MHz, and a fourth harmonic at 23.4375 MHz, and a fifth harmonic at 39.0625 MHz. Harmonics higher than the 5th harmonic will typically not be passed by the 5–42 MHz pass band of the upstream cable system.

Figure 9:
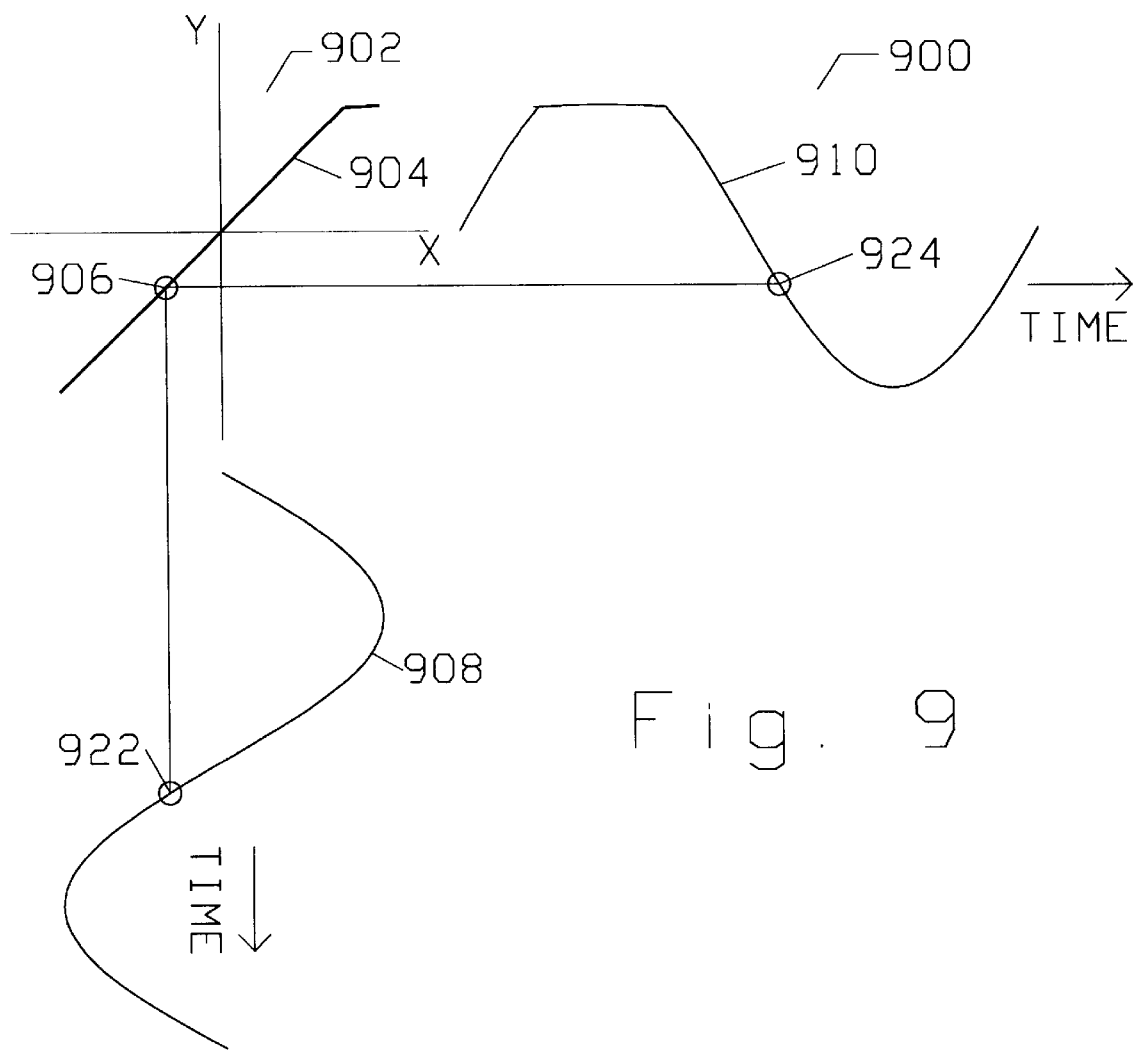
FIG. 9 is a diagram with an X-Y plot that is created by a low-level received sinewave without non-linear distortion and a high-level received sinewave with non-linear distortion.

Description FIG. 9

After the clipped two-burst waveform 834 is received, it can be disassembled and plotted to yield a transfer function, giving an output voltage as a function of an input voltage. FIG. 9 is a diagram 900 showing how an X-Y plot 902 can be made that illustrates a transfer function associated with the non-linear distortion of the signal path. A set of X-axis data points 908 is taken from the received low-level sinewave and plotted with time in the vertical direction. A set of Y-axis data points 910 is taken from the received high-level sinewave and plotted with time in the horizontal direction. Note that for clarity only one of many received cycles are plotted. Connecting many discrete individual data points creates a non-linear transfer function 904. Each individual data point, such as a data point 906 is obtained from an X data point value 922 from the received low-level sinewave, and a corresponding Y data point value 924, taken from the high level received sinewave. From a set of X axis data points 908, a corresponding set of Y data points 910 can be found. For each X-axis data point, a Y-axis data point is found grabbing a point delayed by the time shift $T_{DLY}$ 820, and dividing the Y-axis point by the attenuation factor, e.g. 10.0.

The example of FIG. 9 shows a transfer function characteristic of a device with a sharp clip point, such as a laser transmitter. Other non-linear distortion creating components have other characteristic transfer functions. Once a non-linear distortion transfer function 904 has been obtained, it can be evaluated for the actual coefficients (A, B, C) in the Taylor series expansion. Software routines to determine the coefficients are found in the book "Numerical Recipes in C" second edition, ISBN number 0-521-43108-5 on pages 120–122.

The two-burst waveform will work if there is relative little linear distortion added after the non-linear distortion is created. This would be the case in a laser link where the fiber optic medium would add relatively little linear distortion after the laser is clipped. If there is linear distortion added after the non-linear distortion is created, the effect of the linear distortion must first be eliminated before plotting the transfer function. That is, the transfer function will be in error if the magnitudes and phases of the harmonically related distortion components are changed by linear distortion in the signal path. An example of a system that would experience linear distortion after non-linear distortion is an audio system. The amplifier would add the non-linear distortion, and the speakers and the room's acoustics would add the linear distortion.

Removing linear distortion can be accomplished by several methods. One method is to add a third-burst reference signal waveform to the two-burst waveform to provide channel characterization. A third burst reference signal could be comprised of the fundamental plus all harmonics that will be passed by the signal path. Another method is to add harmonic reference signals to the low-level sinewave burst at time 804 to allow channel characterization at the harmonic frequencies. Before the trace 904 is formed, linear distortion must be eliminated and the harmonic energy must be filtered from the set of X-axis data points 908, leaving only the fundamental sinewave. Processing can be done in the frequency domain to correct any linear distortion from the Y-axis data points 910 by methods known in the art.

Only one cycle is illustrated, but in the above example 80 cycles are available over 1024 points. Thus, significant averaging can be done to remove the contaminating effects of random noise or other signals that may be using the signal path the instant the two-burst waveform is transmitted. Additionally, undesirable ingressing energy falling between harmonically-related distortion components may be zeroed-out in the frequency domain, thereby removing more noise from the trace 904.

Capturing a set of 1024 samples, which is two raised to the 10th power, facilitates processing of the signal in the frequency domain. Fourier transforms are easily performed on set of samples that are integer powers of two.

SUMMARY RAMIFICATIONS AND SCOPE OF THE INVENTION

This patent application discloses three methods to determine the power level at which a signal path generates unacceptable levels of non-linear distortion. Although the measurement of upstream cable plant was used as the main application for descriptive purposes, the techniques are useful for a variety of signal paths with limited dynamic range.

Although the description above contains many specificities, these should not be construed a limiting the scope of the invention but as merely providing illustrations of some of the presently preferred embodiments of this invention. The following variations on these basic distortion-measuring ideas are specifically anticipated:

1. A variety of test signals may be transmitted, provided that they meet the requirements of being repeatable on each transmission. In particular, the signals may be generated by PN generating circuits, or generated by digital to analog converters receiving data from high-speed memory integrated circuits, or generated by numerically controlled oscillators. The test signal may be spectrally shaped or flat in the frequency domain. Likewise the test signals may have probability distribution functions (PDFs) that are bell-shaped, rectangular, or shaped as desired. Random or Gaussian noise has a PDF that is bell-shaped.

2. The test signal may be a single burst, multiple bursts or continuous transmission comprised of a stream of bursts. If a burst transmission is used there will be less interference with digital carriers that may be using the system at the instant the test is done. If the transmission is continuous, the transmitted test signal may be a repeating sequence, such as a PN sequence 3. It must be recognized that multiplication in the frequency domain is mathematically equivalent to a convolution in the time domain. Therefore, the process described in connection with FIG. 5 can also be performed in the time domain. Time domain processing with a convolution of two time traces will directly yield the impulse response. The impulse response thus found can be processed for the energy in the main time period compared to the energy in the early time period plus late time periods.

4. A system can easily be envisioned where the curves of FIG. 3 are automatically generated by a test system that automatically elevates the test signal, followed by an automatic analysis, in order to automatically generate the distortion level vs. reference test signal level curves illustrated in FIG. 4.

5. The test system of the present invention may be used for many more applications than simply testing upstream cable systems. In particular it can be used for testing microwave links, satellite links, high-definition television transmission facilities, and audio systems.

6. The test signal can be an actual information-carrying data transmission if an unimpaired copy of the data transmission is available. The frequency response and non-linear distortion tests can be done by simultaneously capturing a sample of the information-carrying signal applied to the device under test (signal path) and the impaired signal coming out of the device under test. The sample of the signal applied to the device under test, in essence, becomes an unimpaired reference test signal. Actual transmissions of random data have good representative spectral properties, which allow them to be used as test signals. Likewise, if the data can be received error-free at the receive site, an assumed unimpaired reference test signal can be computed and used to process the actual received data for non-linear distortion.

7. The system of the present invention may be used to test loud speaker/acoustic systems. Determining the presence of non-linear distortion can allow the sources of the distortions to be removed. Amplifier distortion, loudspeaker magnet saturation, or sympathetic vibrations in the room can cause non-linear distortion in audio systems.

8. Because of the duality between time and frequency, the non-linear distortion may be also measured in the frequency domain. Doing a vector subtraction on each frequency domain coefficient, thereby removing the signal plus any linear distortion component, can do this. The remainder is the non-linear distortion component in the frequency domain. Squaring the magnitude of each component and adding them together can measure the power of these non-linear distortion components. This process would allow the determination of correlation without necessarily determining the impulse response.

What is claimed is:

1. A test system for measuring a non-linear distortion created by a reference test signal transported on a signal path comprising:
   a transmitter for transmitting the reference test signal;
   a receiver, for receiving an impaired reference test signal, wherein the impaired reference test signal comprises the reference test signal as impaired while passing between the transmitter and receiver through the signal path;
   a digital signal processor connected to an output of the receiver to receive the impaired reference test signal from the receiver, the digital signal processor:

storing a copy of the reference test signal;

computing an impulse response of the signal path using the copy of the reference test signal and the impaired reference test signal;

calculating the energy in the impulse response during time periods of the impulse response that contain primarily non-linear distortion energy.

2. A test system according to claim 1 wherein the stored copy of the reference test signal contains a linear distortion created by the signal path.

3. A test system according to claim 1 wherein the transmitter sends additional reference test signals at multiple power levels and further wherein the digital signal processor determines the non-linear distortion energy for each power level.

4. A test system according to claim 1 wherein the reference test signal comprises a sequence of single burst reference test signals, each having a different power level.

5. A test system according to claim 1 wherein the receiver further captures background noise within the signal path and further wherein the digital signal processor measures the energy contained within the background noise and still further wherein the digital signal processor determines the level of non-linear distortion as compared to the background noise.

6. A test system according to claim 1 wherein the digital signal processor averages the results of a plurality of repeated tests to reduce the effect of background noise.

7. A test system according to claim 1 wherein the reference test signal comprises either of a quadratic chirp, a Koo pulse, a pseudonoise sequence, stepped-frequency waveform, or an OFDM signal with flat spectral energy.

8. A test system according to claim 1 wherein the transmitter is located in a home terminal device and the receiver is located in a headend or a hub site.

9. A test system according to claim 1 wherein the digital signal processor determines the impulse response by performing a frequency-domain division of the reference test signal into the impaired reference test signal, followed by inverse Fourier transform.

10. A test system according to claim 1 wherein the digital signal processor determines the impulse response by performing a convolution in a time domain.

11. A test system as per claim 1, the digital signal processor further:

calculating one of: a total energy in the impulse response, or the energy in the impulse response during time periods of the impulse response that contain primarily signal energy correlated to the reference test signal;

calculating a ratio based on the energy during time periods that contain primarily non-linear distortion energy and one of: the total energy in the impulse response, or the energy during time periods that contain primarily signal energy.

12. A test system for measuring a non-linear distortion created by a signal path comprising:

a transmitter for transmitting a reference test signal wherein the reference test signal comprises an OFDM reference test signal having at least one spectral hole;

a signal path;

a receiver for receiving an impaired reference test signal comprising the reference test signal as impaired while passing between the transmitter and receiver through the signal path;

a digital signal processor connected to an output of the receiver for measuring a total amount of energy within the impaired reference test signal and for measuring an amount of energy within the at least one spectral hole;

wherein the non-linear distortion energy is determined from the energy contained within the at least one spectral hole.

13. A test system according to claim 12 wherein the digital signal processor averages the results of several repeated tests to reduce the effect of background noise.

14. A test system for determining a transfer function of a signal path comprising:

a transmitter for transmitting a two-burst waveform comprised of a low-level sinewave part and a high-level sinewave part;

a signal path;

a receiver for receiving the two-burst waveform as impaired while passing between the transmitter and receiver through the signal path; and a digital signal processor connected to an output of the receiver for determining a non-linear transfer function of the signal path by plotting the time samples of the low-level sinewave on a first axis and delayed time samples of the high-level sinewave on a second axis.

15. A test system according to claim 14 wherein a set of samples comprising the transfer function is averaged to reduce noise.

16. A test system according to claim 14 wherein the coefficients of the Taylor series expansion is determined from the transfer function.

17. A test system according to claim 14 wherein the linear distortion created after the creation of a non-linear distortion is characterized.

18. A test system according to claim 17 wherein the linear distortion created after the creation of the non-linear distortion is removed.

* * * * *